(12) United States Patent
Kassuelke et al.

(10) Patent No.: US 6,312,247 B1
(45) Date of Patent: Nov. 6, 2001

(54) VACUUM DEBULKING TABLE FOR THERMOPLASTIC MATERIALS

(75) Inventors: Gregory T. Kassuelke, Maple Grove; Robert E. Long, Chanhasson; Stephen A. Haglund, Minnetonka, all of MN (US)

(73) Assignee: Alliant Techsystems Inc., Hopkins, MN (US)

( * ) Notice: Subject to any disclaimer, the term of this patent is extended or adjusted under 35 U.S.C. 154(b) by 0 days.

(21) Appl. No.: 09/240,164

(22) Filed: Jan. 29, 1999

(Under 37 CFR 1.47)

(51) Int. Cl.$^7$ .................................................. B29C 70/54
(52) U.S. Cl. ......................... 425/504; 249/78; 156/382; 264/571; 264/510; 425/162; 425/389
(58) Field of Search .................................. 425/504, 389, 425/162, 89; 249/78; 156/382; 264/510, 571

(56) References Cited

U.S. PATENT DOCUMENTS

| | | | | |
|---|---|---|---|---|
| 2,308,453 | * | 1/1943 | Potchen et al. ........................ | 425/389 |
| 3,387,333 | * | 6/1968 | Irvine et al. ............................ | 249/78 |
| 4,028,166 | * | 6/1977 | Leonhart ................................ | 156/382 |
| 4,188,254 | | 2/1980 | Hemperly, Jr. ....................... | 156/382 |
| 4,421,589 | * | 12/1983 | Armini et al. ......................... | 156/382 |
| 4,715,805 | * | 12/1987 | Nasu ...................................... | 425/504 |
| 4,869,770 | * | 9/1989 | Christensen et al. ................. | 156/382 |
| 4,963,215 | | 10/1990 | Ayers .................................... | 156/286 |
| 5,108,532 | | 4/1992 | Thein et al. ........................... | 156/382 |
| 5,171,970 | * | 12/1992 | Chichlowski et al. ................ | 156/382 |
| 5,328,540 | | 7/1994 | Clayton et al. ........................ | 156/382 |
| 5,378,134 | * | 1/1995 | Blot et al. ............................. | 425/389 |
| 5,501,832 | * | 3/1996 | Adams .................................. | 425/389 |
| 5,635,660 | | 6/1997 | McGovern .............................. | 86/21 |
| 5,640,054 | | 6/1997 | McGovern ............................ | 264/3.1 |
| 5,747,725 | | 5/1998 | Stewart et al. ........................ | 102/521 |
| 5,789,699 | | 8/1998 | Stewart et al. ........................ | 102/521 |
| 6,146,576 | * | 11/2000 | Blackmore ............................ | 425/389 |

FOREIGN PATENT DOCUMENTS

| | | |
|---|---|---|
| 42 22 267 A | 4/1993 | (DE) . |
| 0 531 840 A | 3/1993 | (EP) . |
| 2 127 345 A | 4/1984 | (GB) . |

* cited by examiner

Primary Examiner—Robert Davis
(74) Attorney, Agent, or Firm—George A. Leone, Sr.

(57) ABSTRACT

A vacuum debulking table for fiber reinforced thermoplastic prepreg includes a base, a base table mounted to the base, and a platen mounted to the base table. The platen has a frame and the base table includes a vacuum aperture located within the frame. A vacuum pump is connected to the vacuum aperture. The platen includes a heat generator. The table further includes tooling conforming to the frame and a kit to be debulked. A pair of opposing pressurized cylinders is coupled to the base at a first end. A top cover is mounted to the base and attached at a second end of the opposing pressurized cylinders. The top cover includes a flexible bladder. An insulator is mounted to the base table surrounding the platen. An insulation cover blanket is configured to be drawn between the insulator and top cover. An activation switch activates a programmable controller connected to the pressurized actuator control, the heat control and the vacuum control.

14 Claims, 7 Drawing Sheets

VACUUM DEBULKING TABLE FOR THERMOPLASTIC MATERIALS

FIELD OF THE INVENTION

The present invention is generally related to processing equipment and methods for debulking preimpregnated fiber-reinforced material, and, in particular, to a vacuum debulking table and automated process for debulking fiber reinforced thermoplastic prepreg.

BACKGROUND OF THE INVENTION

Thermoplastic prepreg is used to make structural parts for various devices strong, rigid, and lightweight. Thermoplastic prepreg is the material resulting from impregnating fiber reinforcements with a formulated resin. These advanced composite materials offer many advantages over conventional steel and aluminum since composite parts fabricated from thermoplastic prepreg materials are generally stronger and stiffer than metals. Components fabricated from thermoplastic prepreg materials also provide greater resistance to fatigue, creep, wear and corrosion than metals.

In use, several thermoplastic prepreg plies with different fiber orientations are assembled into layers and multiple layers are stacked on top of each other to form a layup. The layup is then cut into thermoplastic prepreg segments. The thermoplastic prepreg segments are then assembled into a kit or wedge to form a particular structural part of the device under construction. Assembly of the kits or wedges requires stacking the thermoplastic prepreg segments in sequence and orienting the pieces according to a geometry envelope. By cutting the thermoplastic prepreg segments from layups, the structural parts of the device receive strength in more than one direction. Composite parts made from thermoplastic prepreg have very high strength in the direction of the fibers and very poor strength in other directions.

Layups are useful because they reduce the amount of time required to tailor the architecture and to catalog the thermoplastic prepreg segments of a particular device part. However, since thermoplastic prepreg material has a very low coefficient of friction, or no tackiness, the plies tend to slide, making stacking, cutting, and assembly extremely difficult. The thermoplastic prepreg plies forming a layup must be retained in alignment during and after cutting. If the thermoplastic prepreg plies are not held together during all stages of assembly, it becomes difficult and labor intensive.

After cutting thermoplastic prepreg segments from a layup, it is advantageous to retain the thermoplastic prepreg segments together in alignment during assembly of the pieces into a kit. Some thermoplastic prepreg segments are bulky and some are very small, so working with thermoplastic prepreg segments that are properly held together greatly reduces assembly time and difficulty. Each thermoplastic prepreg segment must be fastened to corresponding pieces as they are stacked and oriented as part of a kit or wedge. Several kits or wedges are typically molded together to form a composite part, such as a cylinder for a sabot.

Thermoplastic and thermoset carbon reinforced prepreg materials both require intermediate processing to reduce the bulk factor, or a method of reducing the thickness of the assembled materials. This process is normally required for compression molding of thick laminates or in this instance a thick cylinder section. To debulk an assembly pressure and/or temperature need to be applied. Thermoplastic materials require a higher temperature than do thermoset materials, which can be debulked with pressure alone because of tack of the resin matrix. The purpose for thickness reduction is to reduce the amount of movement of the individual layers of prepreg material. The orientations of the carbon fibers in each layer are critical to the structural strength of the finished part or assembly of prepreg layers being molded into a preform ready for machining.

Known methods for debulking exhibit some unfortunate drawbacks. For example, ultra sonic welding of kit assemblies lacks sufficient heat control and required pressure and provides uneven heat energy. Another process, ultra sonic tack welding, requires painstaking hand welding of kit assemblies.

In yet another known method, ten-degree wedge compression molding, kit assemblies have been fabricated successfully. Unfortunately, the compression method requires costly tooling, control systems, and a large press. The compression method also suffers from long cycle times of up to four hours and high labor costs. In this method, the tool temperature is raised to melt the thermoplastic resin. The part is compressed. After compression, the part must be cooled down to room temperature before part removal and cleaning and preparation of the tool with mold releases prior to the next cycle. In addition, the molded parts must be sand blasted before a subsequent molding operation can be performed.

Another area where known apparatus and methods are inadequate is debulking of polyetherimide (PEI) thermoplastic materials and the like. PEI, for example, has a typical melting temperature of 700 degrees F. and a typical softening temperature of 550 degrees F. In order for the prepreg plies to adhere to each other in a debulked state they must be debulked at about 550° F. No known single automated station for debulking prepreg materials works at that temperature at a reasonable speed.

In contrast to known processes, the present invention uses relatively inexpensive tooling and is totally self contained. As compared to known systems, no large costly equipment is needed for operation. A debulking cycle, employed in accordance with the teachings of the invention, is completely controlled. Frequent clean up of tooling is not required since the tooling and other debulking apparatus are maintained at a constant temperature. Because no release agents are required, sand blasting and other follow on operations are not required.

This invention may be used on various thermoset prepreg assemblies. However, the examples of the invention described herein will focus on thermoplastic (e.g. graphite and PEI) prepreg product assemblies mainly used to produce 120 mm tank ammunition. It will be understood that the examples herein are by way of illustration and that the invention is not so limited.

SUMMARY OF THE INVENTION

A vacuum debulking table for fiber reinforced thermoplastic prepreg includes a base, a base table mounted to the base, and a platen mounted to the base table. The platen has a frame therein and the base table includes a vacuum aperture located within the frame. A vacuum pump is connected to the vacuum aperture, wherein the vacuum pump has a vacuum control. The platen includes a heat generator where the heat generator is connected to a heat control. The table further includes tooling conforming to the frame and a kit to be debulked. A pair of opposing pressurized cylinders is coupled to the base at a first end, where the opposing pressurized cylinders are electrically connected to be actuated by a pressurized actuator control. A top cover is mounted to the base and attached at a second end of the opposing pressurized cylinders, the top cover including a flexible bladder. An insulator is mounted to the base table surrounding the platen. An insulation cover blanket is configured to be drawn between the insulator and top cover. At least one activation switch activates a programmable controller connected to the pressurized actuator control, the heat control and the vacuum control.

In one embodiment the present invention provides a debulking table adaptable to process different materials because an included control system is adaptable for any temperature and cycle times can typically be changed in a matter of seconds.

In another embodiment the present invention provides a debulking table that reduces heat history where the tooling is maintained at a constant temperature so that thermal expansion of the tooling will not substantially affect the part geometry, thereby reducing cycle time considerably from prior known processes.

Other objects, features and advantages of the present invention will become apparent to those skilled in the art through the description of the preferred embodiment, claims and drawings wherein like numerals refer to like elements.

DETAILED DESCRIPTION OF THE PREFERRED EMBODIMENT

Figure 1:
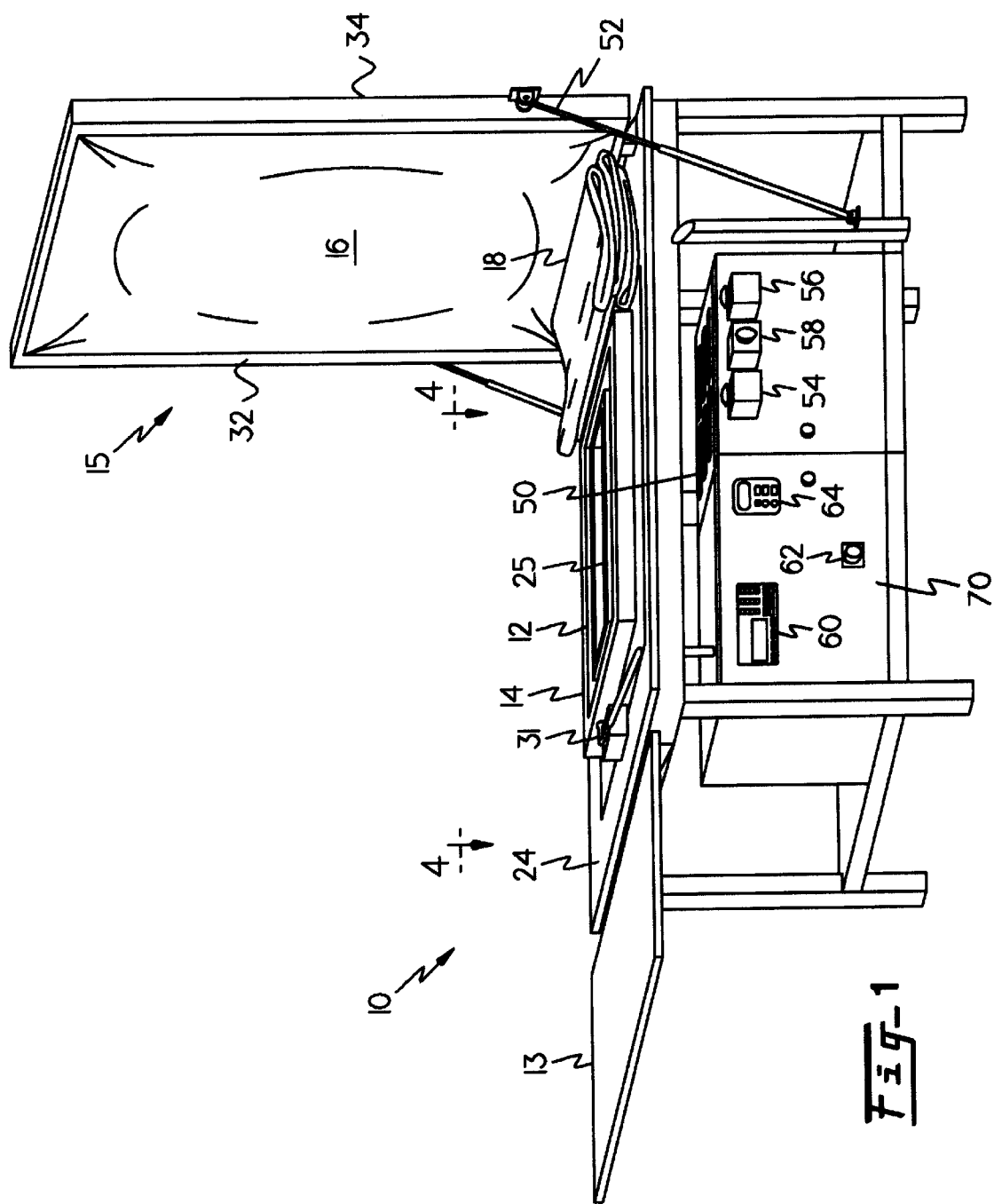
FIG. 1 is perspective view of one example of a vacuum debulking table for fiber reinforced thermoplastic prepreg of the present invention.

Now referring to FIG. 1, FIG. 1 shows a perspective view of one example of a vacuum debulking table 10 for fiber reinforced thermoplastic prepreg of the present invention. It will be understood that the illustrations and descriptive details herein are by way of example and not limitation of the invention. The vacuum debulking table 10 includes a platen 25 having a frame 12 therein, a top cover 15, an insulator 14 and a base table 24. The base table 24 is preferably a flat metal table, more preferably comprising an aluminum slab. The platen 25 and frame 12 are constructed of a suitable heating material such as steel. Conventional electric heating rods 525 (best shown in FIG. 5) placed therein in a spiral pattern heat the platen 25 and frame 12. A thermocouple 31 is coupled to the platen 25 in a location suitable for sensing the average temperature of the platen.

The top cover 15 includes a cover bladder 16 attached by conventional means to a top frame 34. The top frame 34 preferably comprises a metal such as aluminum or other suitable framing material. The top frame 34 is attached to table 24 by a suitable known hinge mechanism (not shown). An insulation cover blanket 18 is juxtaposed between the insulator and top frame. The blanket is preferably disposable and may advantageously be placed loosely on the table. A seal 32 is attached to the cover frame and temporarily seals the top cover to the tabletop when a vacuum is applied. The seal 32 may be attached by any known attachment means including any adhesive compatible with the seal and frame materials. In one embodiment of the invention, the seal 32 is comprised of silicon rubber. The cover bladder 16 preferably is constructed of rubber material that stretches to conform to the tooling geometry and applies pressure to the tools.

The insulation cover blanket 18 protects the cover bladder 16 from the temperature of the platen and tool. In one embodiment of the debulking table of the invention, the insulation cover blanket 18 is a porous Teflon coated fiberglass blanket having a thickness of about 0.003 inches. One such material is sold by Airtech International Inc. of Carson, Calif. under the trade name "Release Ease 234 TFP Porous." Release Ease 234 TFP is porous Teflon coated fiberglass and is available in 38 inch widths.

The insulator 14 is preferably constructed of a ceramic material well known in the art such as, for example, alumina-silica insulation or other equivalent materials with similar insulating properties. The insulator 14 serves to protect the cover bladder from the hot platen and insulate the table top 24. The heated platen 25 operates to generate the heat required to consolidate the prepreg material. The heated platen 25 is constructed of in a conventional manner to generate heat of up to about 700 degrees F.

Figure 2:
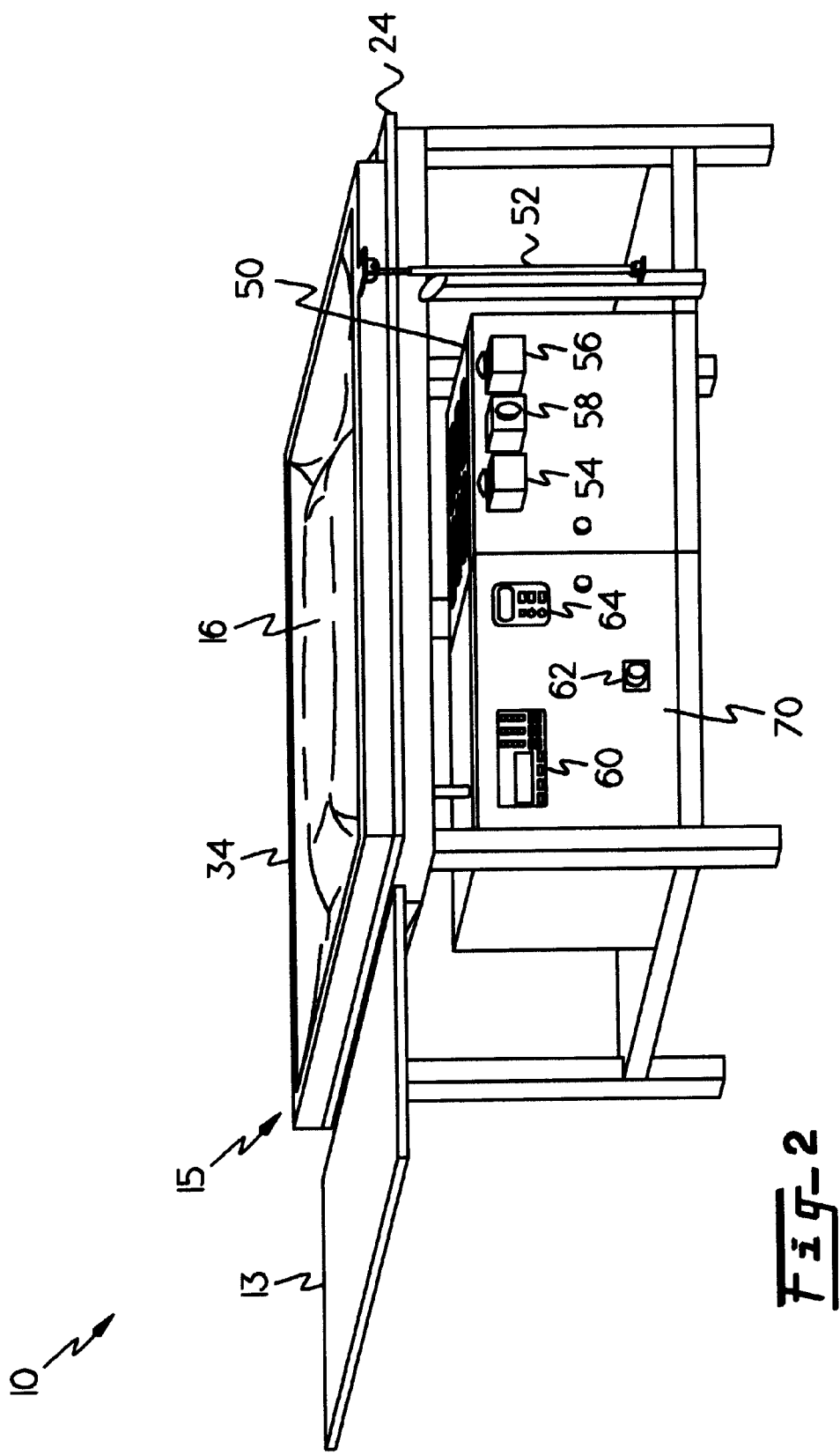
FIG. 2 is front perspective view of one example of a vacuum debulking table for fiber reinforced thermoplastic prepreg of the present invention.

Referring now to FIG. 2, a front view of one example of a vacuum debulking table for fiber reinforced thermoplastic prepreg of the present invention is shown. The top cover 15 is shown in a closed position. A control panel 70 includes a programmable controller 60, a temperature control 64 and a main power on/off switch 62. Also shown are first and second interactive safety switches 54, 56. A kill switch 58 is included and connected to turn off the assembly in the event of an emergency. The programmable controller 60 is a standard control panel known in the art that includes a programmable device, such as a CPU programmed to control the temperature, application of vacuum, time of cycle, raising and lowering of the cover, and interactive safety switches. Those skilled in the art, having the benefit of this disclosure, will understand how to program and use the programmable controller 60 and the temperature control 64. The control system as employed in one example of the invention is explained in more detail below with reference to FIG. 6.

The programmable controller 60 also operates to actuate a pair of opposing pressurized cylinders 52 attached to the top frame 34 to raise and lower the top cover 15 when a debulking cycle is initiated. The vacuum pump and lines are also electrically connected to tie actuated by the programmable controller to create the pressure required to debulk the parts. The debulking table 10 is preferably designed to be a single work station where two operators could be utilized, working from opposing sides of the work station.

Also shown in FIG. 2 is a cooling table 13 conveniently mounted adjacent the debulking table 10. A suitable cooling table comprises a flat sheet of metal having a substantial thickness to serve as a heat sink for hot debulked thermoplastic material. In one example, the cooling table 13 comprised a 1-inch thick sheet of aluminum.

Figure 3:
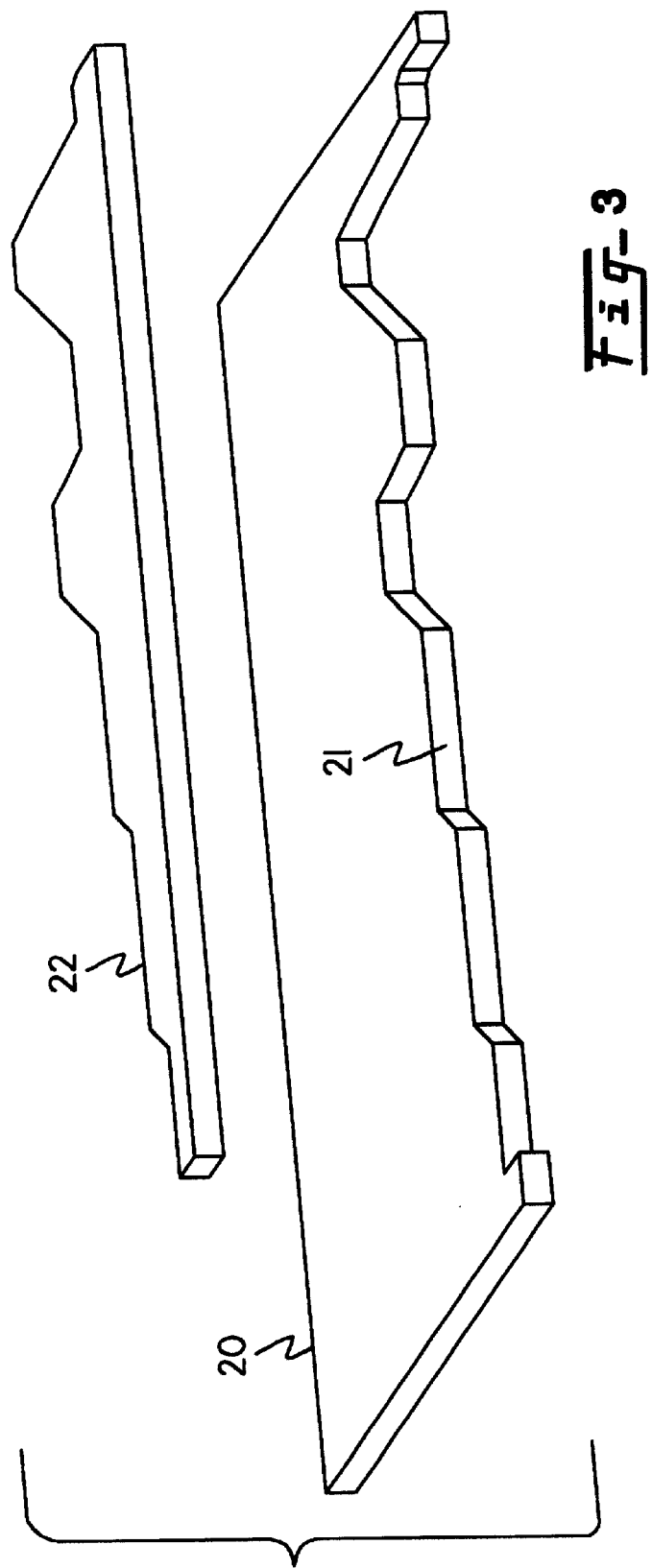
FIG. 3 is an exploded perspective view of one example of tooling employed by a vacuum debulking table for fiber reinforced thermoplastic prepreg of the present invention.

Referring now to FIG. 3, a first tool 20 and a second tool 22 are shown in a perspective view. In one embodiment of the invention, the first tool 20 and the second tool 22 comprise metal compression tooling. The first and second tools are precisely machined to the dimensions and shape of the desired molded prepreg kit. In one example, the tools comprise steel fabricated by a precision process, such as wire EDM machining, for example. The first tool 20 and the second tool 22 are preferably shaped substantially similarly to the shape of the prepreg kit to be debulked and sized to be snugly fit within the frame 12. The first tool 20 and the second tool 22 are also preferably shaped to mate with each other. When used together within the frame, the prepreg kit to be debulked is placed within the first tool 20 along the inside edge 21 and covered by the second tool 22 so as to be compressed when a suitable vacuum is applied. The first tool 20 and second tool 22 maintain the geometry of the consolidated part and eliminate rounding of the outside edges of the part. In a typical application, depending on the part thickness, up to about 30 pieces are stacked to be debulked.

Figure 4:
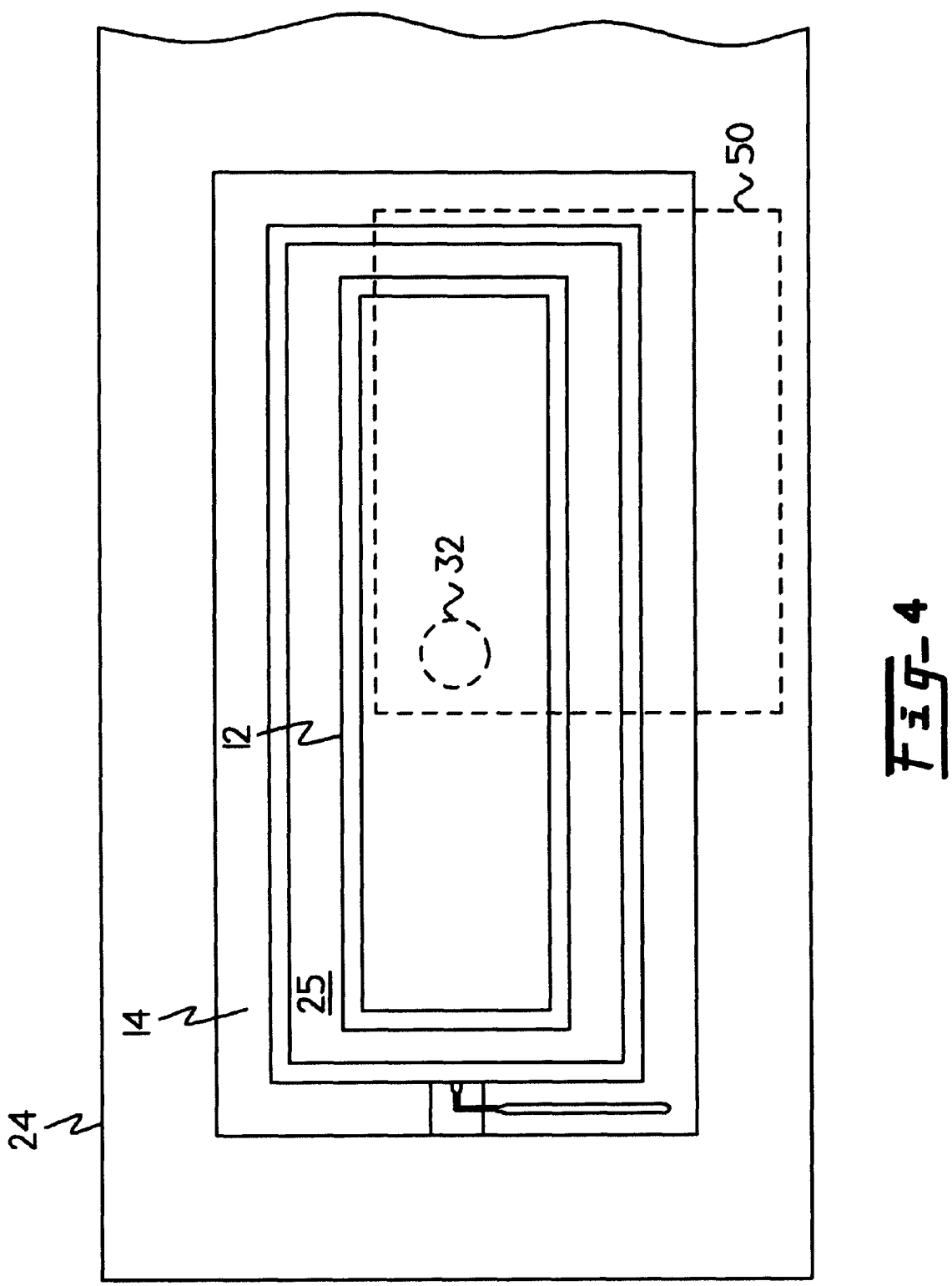
FIG. 4 is a top view of one example of a vacuum debulking table for fiber reinforced thermoplastic prepreg of the present invention where tooling is removed and an aperture for applying a vacuum is illustrated.

Referring now to FIG. 4 a top view of one example of a vacuum debulking table for fiber reinforced thermoplastic prepreg of the present invention is shown and a vacuum aperture 32 for applying a vacuum is illustrated. The vacuum aperture 32 is cut through the base table 24 and preferably approximately centered under the platen 25 within the frame 12. A conventional vacuum pump 50 is connected to the aperture to apply about 15 p.s.i. of pressure (i.e. about one (1) atmosphere pressure) by sealing the rubber cover bladder with the thermal insulator 14 to the base table 24.

Figure 5:
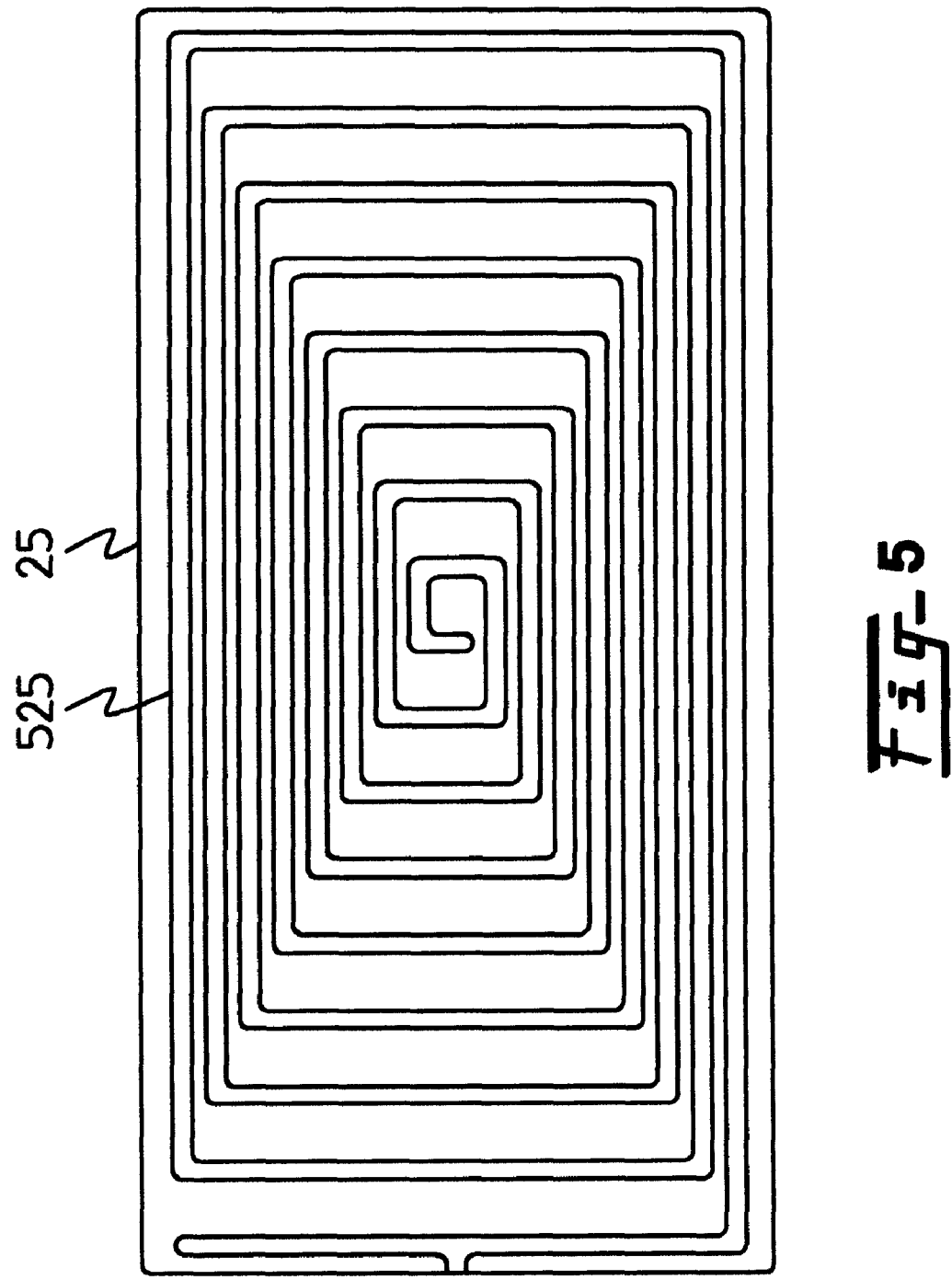
FIG. 5 is a bottom view of one example of a platen and heating coils mounted thereon as employed in one example of the present invention.

Referring now to FIG. 5, a bottom view of one example of a platen 25 and heating coils 525 mounted thereon as employed in one example of the present invention is shown. The heating coils 525 are preferably electric heating coils constructed and mounted in accordance with known principles. The heating coils 525 are wired to the heating control 64.

Figure 6:
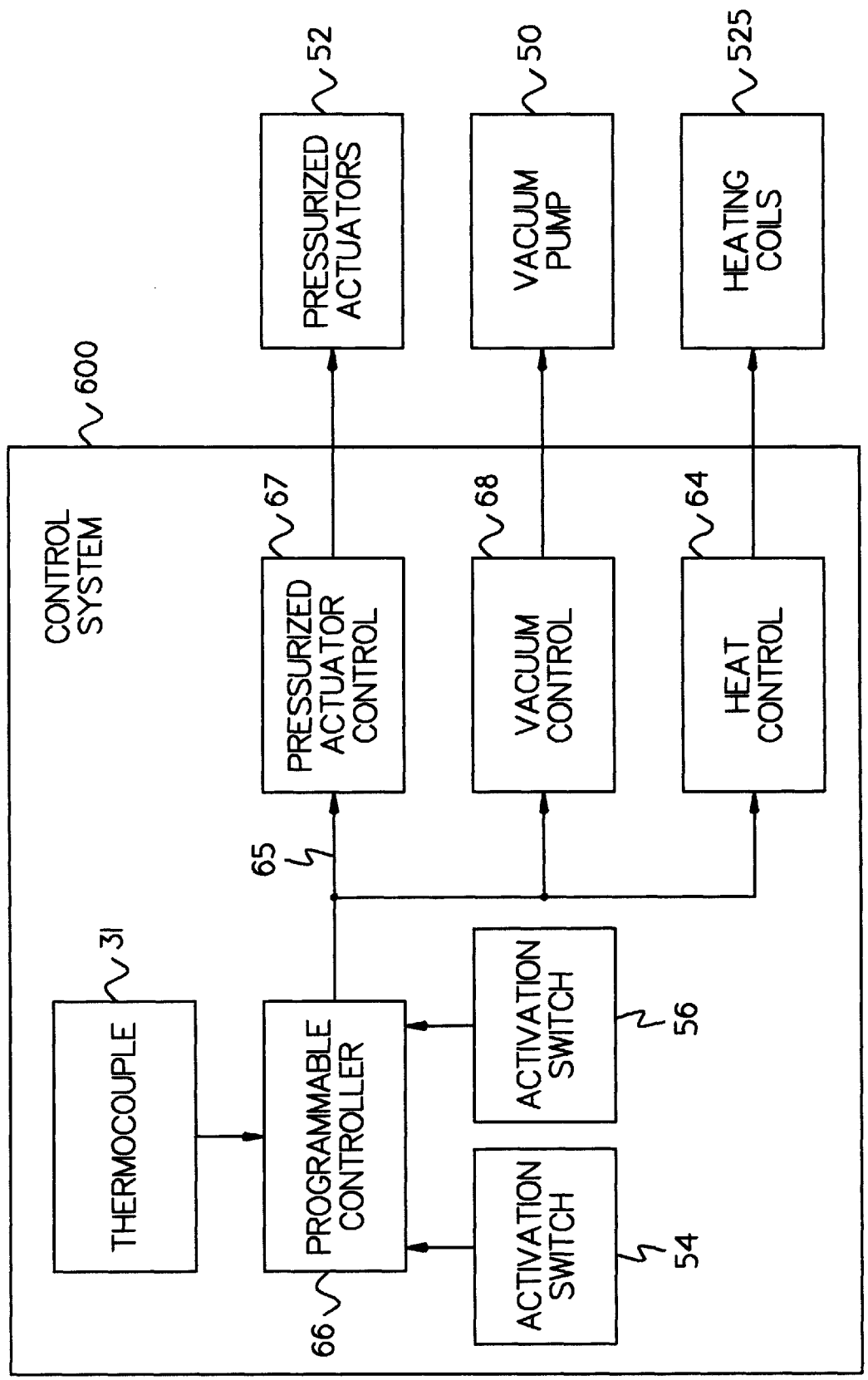
FIG. 6 is a schematic block diagram of one example of a programmable control system used for a vacuum debulking table for fiber reinforced thermoplastic prepreg of the present invention.

Referring now to FIG. 6, a schematic block diagram of one example of a programmable control system 600 used for a vacuum debulking table for fiber reinforced thermoplastic prepreg of the present invention is shown. For purposes of explaining control signals, the programmable control system 600 is shown for illustrative purposes to include the programmable controller 60, the activation switches 54,56, the thermocouple 31, a plurality of control lines 65, a pressurized actuator control 67, a vacuum control 68 and the heat control 64. Control signals from the programmable controller 60 are transmitted on a plurality of control lines 65 to the pressurized actuator control 67, the vacuum control 68 and the heat control 64. The pressurized actuator control 67, the vacuum control 68 and the heat control 64 are respectively coupled to the pressurized actuators 52, vacuum pump 50 and heating coils 525, so as to precisely control operation each of those components in response to control signals from the programmable controller 60.

Figure 7:
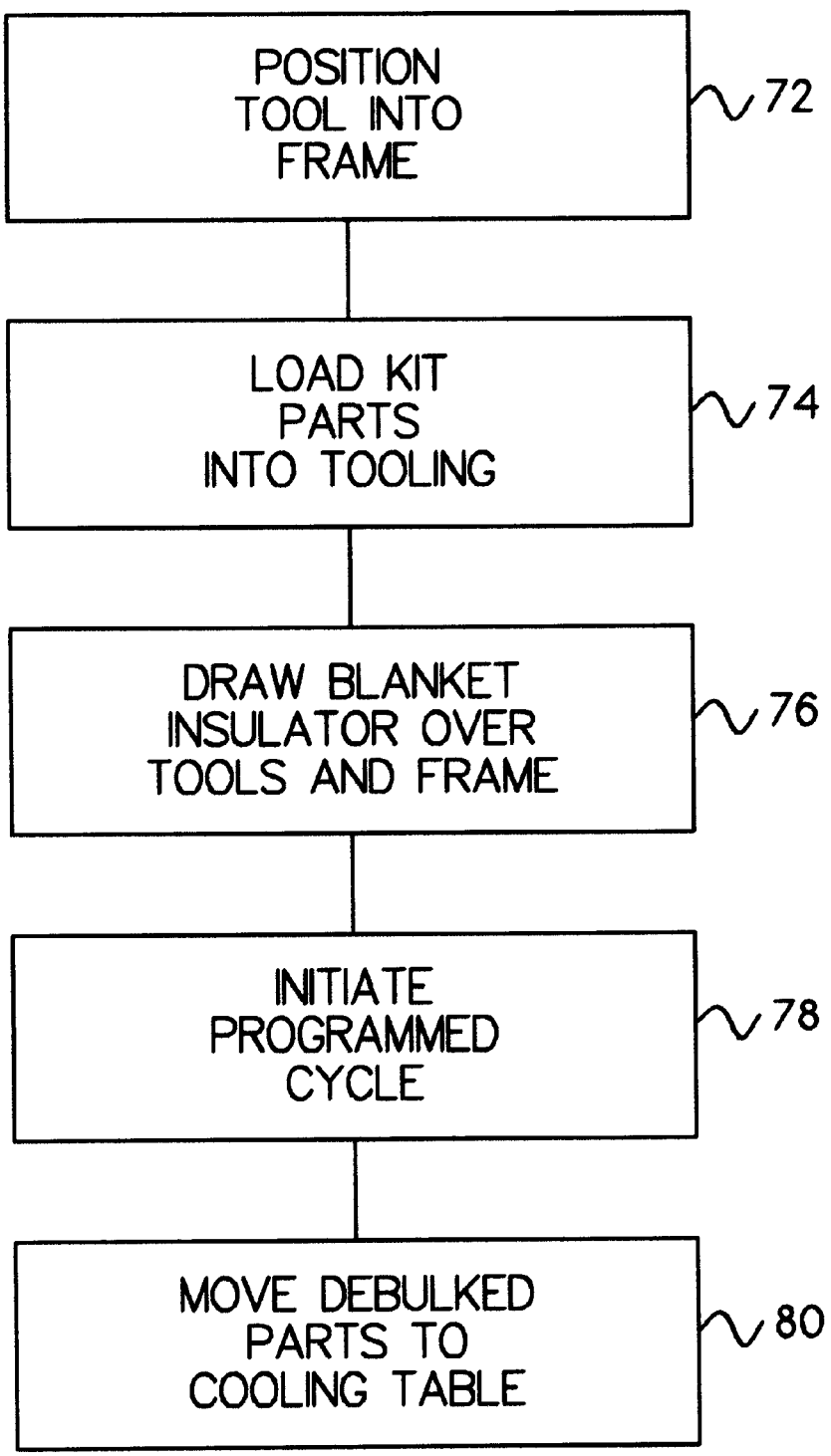
FIG. 7 is a schematic block diagram of one example of a method of the invention for debulking thermoplastic prepreg.

Referring now to FIG. 7, a block diagram of one example of the method of the invention is shown. The process is initiated at step 72 where, the loaded tools are placed into the frame. At step 74, kit parts are loaded by an operator by fitting the parts within a space conforming to the shape of the assembled kit, where the conforming space is formed by the first tool 20 and the frame. After the kit parts are dropped into the first tool 20, the second tool 22 is placed over the parts. At step 76, the insulation blanket is drawn over the loaded tools within the frame so as to be located between the cover bladder and the tooling to protect the cover bladder. At step 78 a programmed cycle is initiated by an operator by simultaneously activating first and second interactive safety switches 54, 56. It will be understood that two interactive switches are connected in a conventional manner to cooperate for safety reasons, and that a single switch may be used where operator safety is not compromised. Once the programmed cycle is complete, the top cover is automatically lifted through operation of the actuators by the programmable controller 60. At step 80, the now debulked parts are removed at the cycle end and placed on the cooling table 13 to cool. The disposable insulation blanket may be removed when the kit has sufficiently cooled.

One example of a programmed cycle includes applying heat and pressure for about 15 minutes to debulk a typical 10 degree prepreg wedge kit, where the prepreg substantially comprises PEI material. In such an application, the platen is preferably heated to the softening point of the plastic in the prepreg material, typically about 550° F.

The invention has been described herein in considerable detail in order to comply with the Patent Statutes and to provide those skilled in the art with the information needed to apply the novel principles of the present invention, and to construct and use such exemplary and specialized components as are required. However, it is to be understood that the invention may be carried out by specifically different equipment and devices, and that various modifications, both as to the equipment details and operating procedures, may be accomplished without departing from the true spirit and scope of the present invention.

For example, the apparatus and method of the invention may also be used to process composites comprising unidirectional fibers and nonwoven fibers that may be any known fibers used in fiber reinforced composites including carbon, aramid fiber and glass fibers. Additionally, the method and apparatus of the invention may be used to process composite materials comprising thermoplastic resins including polyesters (including copolyesters), e.g., polyethylene terephthalate, "Kodar" PETG copolyester 6763 (Eastman Kodak); polyamides, e.g., nylon 6,6; polyolefins, e.g., polypropylene; also included are high temperature resins such as an amorphous polyamide copolymer based upon bis(para-aminocyclohexyl) methane, a semicrystalline polyamide homopolymer also based on bis(para-aminocyclo-hiaxyl) methane, and polyetheretherketone.

What is claimed is:

1. A vacuum debulking table for fiber reinforced thermoplastic prepreg comprising:
   a) a base;
   b) a base table mounted to the base;
   c) a platen mounted to the base table, the platen having a frame therein and the base table including a vacuum aperture located within said frame, said platen including a heat generator where said heat generator is connected to a heat control;
   d) tooling conforming to said frame and a kit to be debulked;
   e) a pair of opposing pressurized cylinders coupled to said base at a first end, where said opposing pressurized cylinders are electrically connected to be actuated by a pressurized actuator control;
   f) a top cover mounted to said base and attached at a second end of said opposing pressurized cylinders, said top cover including a flexible bladder;

g) an insulator mounted to said base table surrounding said platen;

h) an insulation cover blanket configured to be drawn between the insulator and top cover;

i) at least one activation switch;

j) a vacuum pump connected to said vacuum aperture, wherein said vacuum pump has a vacuum control; and k) a programmable controller connected to said at least one activation switch, said pressurized actuator control, said heat control and said vacuum control.

2. The vacuum debulking table of claim 1 wherein the base table comprises a flat metal table.

3. The vacuum debulking table of claim 2 wherein the base table comprises an aluminum slab.

4. The vacuum debulking table of claim 1 wherein the platen includes heating rods mounted therein in a spiral pattern.

5. The vacuum debulking table of claim 1 wherein the insulator comprises ceramic material.

6. The vacuum debulking table of claim 1 wherein the top cover includes a cover bladder attached to a top frame, wherein the top frame includes a seal attached to the top frame.

7. The vacuum debulking table of claim 1 wherein the flexible bladder comprises rubber material that stretches to conform to the tooling geometry and applies pressure to the tools.

8. The vacuum debulking table of claim 1 wherein the insulation cover blanket comprises porous coated fiberglass.

9. The vacuum debulking table of claim 1 wherein the insulator comprises alumina-silica insulation.

10. The vacuum debulking table of claim 1 wherein the platen is constructed to generate heat in the range of 550° F. to 700° F.

11. The vacuum debulking table of claim 1 wherein said at least one activation switch comprises first and second interactive safety switches.

12. The vacuum debulking table of claim 1 wherein said tooling includes a first tool and a second tool constructed to mate with each other such that, when mated together within the frame a kit to be debulked is placed within the first tool along an inside edge and covered by the second tool so that the kit is compressed when a vacuum is applied during a debulking cycle.

13. The vacuum debulking table of claim 1 wherein the vacuum pump is connected to apply one atmosphere of pressure by sealing the rubber cover bladder with the thermal insulator to the base table.

14. A vacuum debulking table for debulking a fiber reinforced thermoplastic prepreg sabot kit, the vacuum debulking table comprising:

a) a base;

b) a base table mounted to the base;

c) a platen mounted to the base table, the platen having a frame therein and the base table including a vacuum aperture, said platen including a heat generator where said heat generator is connected to a heat control means;

d) tooling conforming to said frame and a kit to be debulked;

e) means for flexibly covering said kit and said tooling when said kit and said tooling are positioned within said frame, said covering means mounted to said base or base table;

f) means for closing attached to said covering means, where said closing means is also coupled to said base, and, further, where said means for closing is coupled to a means for actuating;

g) means for insulating said platen;

h) means for protecting configured to be drawn between the insulating means and covering means;

i) means for applying a vacuum connected to said vacuum aperture, wherein said means for applying a vacuum has a vacuum control means; and j) means for programmably controlling connected to said means for actuating, said heat control means and said vacuum control means, where said programmably controlling means includes means for initiating a programmed cycle wherein said programmed cycle includes the programmed steps of:

i) automatically closing a top cover over said insulating blanket, ii) applying heat to said kit parts through said platen frame, iii) applying a vacuum to said kit parts, and iv) automatically opening said top cover after a predetermined cycle period has elapsed.

* * * * *